US012608007B2

(12) United States Patent
Yamamoto et al.

(10) Patent No.: US 12,608,007 B2
(45) Date of Patent: Apr. 21, 2026

(54) VEHICLE-ORIENTED SYSTEM AND INFORMATION READING METHOD

(71) Applicant: Aichi Steel Corporation, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 722 days.

(21) Appl. No.: 18/011,844

(22) PCT Filed: Jun. 24, 2021

(86) PCT No.: PCT/JP2021/024025
§ 371 (c)(1),
(2) Date: Dec. 21, 2022

(87) PCT Pub. No.: WO2021/261570
PCT Pub. Date: Dec. 30, 2021

(65) Prior Publication Data
US 2023/0259140 A1 Aug. 17, 2023

(30) Foreign Application Priority Data
Jun. 26, 2020 (JP) ................................. 2020-110872

(51) Int. Cl.
*G05D 1/00* (2024.01)
*E01F 11/00* (2006.01)

(52) U.S. Cl.
CPC ............ *G05D 1/0259* (2013.01); *E01F 11/00* (2013.01); *G05D 1/0231* (2013.01)

(58) Field of Classification Search
None
See application file for complete search history.

(56) References Cited

U.S. PATENT DOCUMENTS

| | | |
|---|---|---|
| 6,378,772 B1 | 4/2002 | Yonemura |
| 11,119,500 B1 | 9/2021 | Yamamoto et al. |

(Continued)

FOREIGN PATENT DOCUMENTS

| | | |
|---|---|---|
| CN | 103234564 A | 8/2013 |
| CN | 106249736 A | 12/2016 |

(Continued)

OTHER PUBLICATIONS

International Search Report and Written Opinion mailed on Sep. 14, 2021, received for PCT Application PCT/JP2021/024025, filed on Jun. 24, 2021, 10 pages including English Translation.

*Primary Examiner* — Farhana A Hoque
(74) *Attorney, Agent, or Firm* — XSENSUS LLP

(57) ABSTRACT

In a vehicle-oriented system (1) for providing information to a vehicle (5) side by using an information providing area (11) provided on a plane where a vehicle (5) moves, a magnetic distribution indicating the information by a plurality of N-pole magnetic markers (10N) is formed in the information providing area (11), and a sign (100) for identifying a position and orientation of the information providing area (11) is provided in the information providing area (11). Therefore, information can be provided by a magnetic method irrespective of a forwarding direction of the vehicle (5).

19 Claims, 13 Drawing Sheets

(56)         References Cited

U.S. PATENT DOCUMENTS

| 2011/0170118 | A1* | 7/2011 | Mika | G05D 1/0234 |
|---|---|---|---|---|
| | | | | 324/207.13 |
| 2019/0027974 | A1 | 1/2019 | Kanno | |
| 2019/0098468 | A1 | 3/2019 | Yamamoto et al. | |
| 2021/0138916 | A1 | 5/2021 | Kanno | |
| 2021/0271261 | A1 | 9/2021 | Yamamoto et al. | |

FOREIGN PATENT DOCUMENTS

| CN | 108229628 | A | 6/2018 |
|---|---|---|---|
| JP | H06-36086 | A | 2/1994 |
| JP | 06-312592 | A | 11/1994 |
| JP | 2000-45236 | A | 2/2000 |
| JP | 2003-109173 | A | 4/2003 |
| JP | 2006-252254 | A | 9/2006 |
| JP | 2008-009534 | A | 1/2008 |
| JP | 2018-10356 | A | 1/2018 |
| JP | 2019-170146 | A | 10/2019 |
| WO | 2017/187881 | A1 | 11/2017 |
| WO | 2020/022196 | A1 | 1/2020 |

* cited by examiner

VEHICLE-ORIENTED SYSTEM AND INFORMATION READING METHOD

CROSS-REFERENCE TO RELATED APPLICATIONS

The present application is based on PCT filing PCT/JP2021/024025, filed Jun. 24, 2021, which claims priority to JP 2020-110872, filed Jun. 26, 2020, the entire contents of each are incorporated herein by reference.

TECHNICAL FIELD

The present invention relates to a vehicle-oriented system capable of providing information to a vehicle side by using magnetic markers, and an information reading method in the vehicle-oriented system.

BACKGROUND ART

Conventionally, magnetic markers disposed on a road for vehicles have been known (for example, refer to Patent Literature 1). The magnetic markers can be detected by using, for example, a magnetic sensor included in a vehicle. For example, by using the magnetic markers disposed along a lane, automatic driving can be achieved, as well as various driving assists such as automatic steering control and lane departure warning.

Information which a single magnetic marker can provide to a vehicle side is not much. Thus, a system capable of providing information to the vehicle side by using a plurality of magnetic markers has been suggested (for example, refer to Patent Literature 2). In this system, for example, a combination of magnetic polarities of magnetic markers arrayed along a lane indicates information. When traveling along the lane where the magnetic markers are arrayed, the vehicle sequentially detects the magnetic polarities of the magnetic markers and identifies a combination of magnetic polarities, and thereby can read the information.

CITATION LIST

Patent Literature

Patent Literature 1: Japanese Unexamined Patent Application Publication No. 2018-010356
Patent Literature 2: Japanese Unexamined Patent Application Publication No. 2003-109173

SUMMARY OF INVENTION

Technical Problem

However, in the above-described system, there is a problem in which information cannot be read unless the vehicle travels along a route where magnetic markers are disposed.

The present invention was made in view of the above-described conventional problem, and is to provide a system or method for providing information by a magnetic method, a vehicle-oriented system and information reading method capable of providing information irrespective of a forwarding direction of a vehicle.

Solution to Problem

One mode of the present invention resides in a vehicle-oriented system for providing information to a vehicle side by using an information providing area provided on a plane where a vehicle moves, wherein in the information providing area, a magnetic distribution indicating the information is formed, and a sign allowing a position and orientation of the information providing area to be identified is provided.

One mode of the present invention resides in an information reading method of reading information from an information providing area provided on a plane where a vehicle moves, wherein in the information providing area, a magnetic distribution indicating the information is formed, and a sign allowing a position and orientation of the information providing area to be identified is affixed, and the method including:

obtaining, when the vehicle passes over the information providing area, a magnetic distribution in the information providing area and detecting the sign and identifying the orientation of the information providing area; and identifying and reading information indicated by the obtained magnetic distribution in accordance with the identified orientation of the information providing area.

Advantageous Effects of Invention

The information providing area according to the present invention is an area where a magnetic distribution indicating the information is formed. This information providing area is provided with a sign allowing the position and orientation of the information providing area to be identified. According to this sign, the position of the information providing area can be identified, and the direction of the vehicle entering the information providing area can be identified. With this, on the vehicle side, information indicated by the information providing area can be read with high reliability.

DESCRIPTION OF EMBODIMENTS

Figure 1:
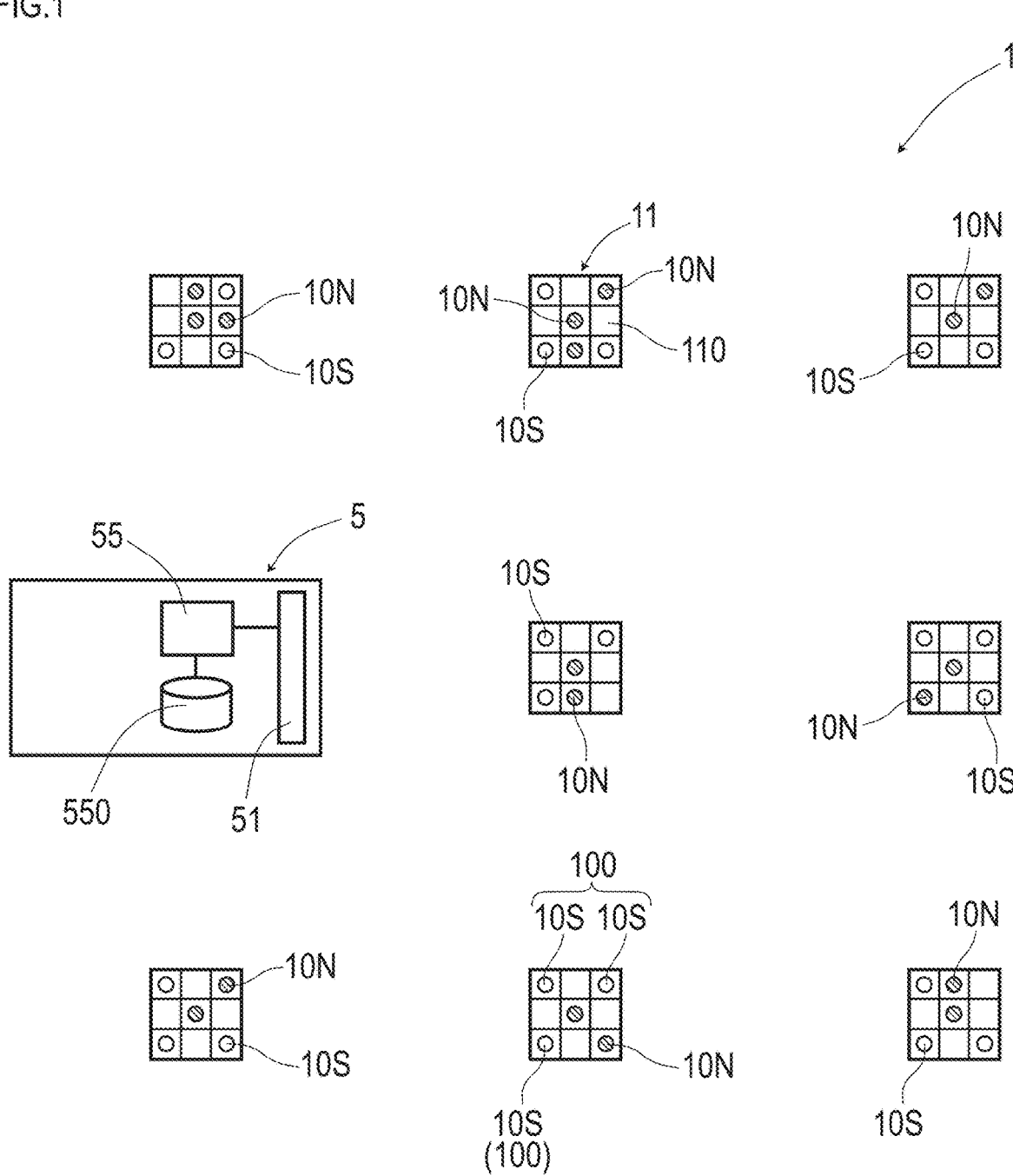
FIG. 1 is a descriptive diagram of a vehicle-oriented system in a first embodiment.

Embodiments of the present invention are specifically described by using the following embodiments.

First Embodiment

The present embodiment is an example regarding vehicle-oriented system 1 which provides information to a vehicle 5 side by using a magnetic method. The details of this are described by using FIG. 1 to FIG. 10.

Vehicle-oriented system 1 (FIG. 1) is a system which provides information to the vehicle 5 side by using information providing areas 11 provided on a plane where vehicle 5 moves. In the present embodiment, as the plane where vehicle 5 moves, a paved surface in a container yard at a harbor, a ramp area at an airport, or the like is assumed. As vehicle 5, a vehicle which conducts works in the container yard, ramp area, or the like is assumed. These areas are open spaces and, in this point, are different from general roads. In the container yard, ramp area, or the like, each vehicle 5 moves with a high degree of freedom as avoiding other vehicles, airplanes, and people. In these open spaces, the direction in which vehicle 5 moves is varied, and the direction of vehicle 5 entering each information providing area 11 is indefinite.

In vehicle-oriented system 1, information providing areas 11 are two-dimensionally arranged on a paved surface in a container yard, ramp area, or the like so as to form grid points. When passing over each information providing area 11, vehicle 5 can read information irrespective of the direction of entering this information providing area 11. The information includes various information, such as information indicating an attribute of a working point, position information, and attention information. Examples of the attribute of the working point include a goods-receiving position and a goods-delivering position.

In information providing area 11 (FIG. 2), magnetic markers 10, which are one example of a magnetic generation source, are arranged to form a magnetic distribution. Information providing area 11 is an area in a square shape (one example of a rectangular shape) with 1 m in height and 1 m in width. This information providing area 11 in a square shape is divided into nine sections 110 of 3×3. Each section 110 having a size of approximately 33 cm×approximately 33 cm is an area for arranging magnetic marker 10.

Magnetic marker 10 (FIG. 3) is a flat piece-like marker having a diameter of 100 mm and a thickness of 2 mm. This magnetic marker 10 is formed of circular magnet sheet 101. Magnet sheet 101 is an isotropic ferrite rubber magnet having a maximum energy product (BHmax) of approximately 6.4 kJ/m$^3$. Magnetic marker 10 has both front and back surfaces, one surface forming the N pole and the other surface forming the S pole. When magnetic marker 10 is disposed, the magnetic polarity detectable on the vehicle 5 side is switched between the N pole and the S pole in accordance with which surface is oriented upward.

In the description below, magnetic marker 10 disposed in a state in which the surface of the N pole is oriented upward and detectable on the vehicle 5 side as the N pole is referred to as N-pole magnetic marker 10N (refer to FIG. 2) as appropriate. Also, magnetic marker 10 disposed in a state in which the surface of the S pole is oriented upward and detectable on the vehicle 5 side as the S pole is referred to as S-pole magnetic marker 10S as appropriate. In information providing area 11 of FIG. 2, N-pole magnetic marker 10N is used to provide information to the vehicle 5 side. S-pole magnetic marker 10S forms a sign 100 that can identify the position and orientation of information providing area 11.

In vehicle-oriented system 1, in information providing area 11 as a two-dimensional area (FIG. 2), any number including zero of N-pole magnetic markers 10N are two-dimensionally arranged, and information is indicated by its arrangement pattern. Signs 100 are S-pole magnetic markers 10S arranged in three sections of four sections 110 forming corner portions of information providing area 11 in a square shape. In information providing area 11, six sections 110 excluding three sections 110 where S-pole magnetic markers 10S are arranged can be used for providing information.

Figure 4:
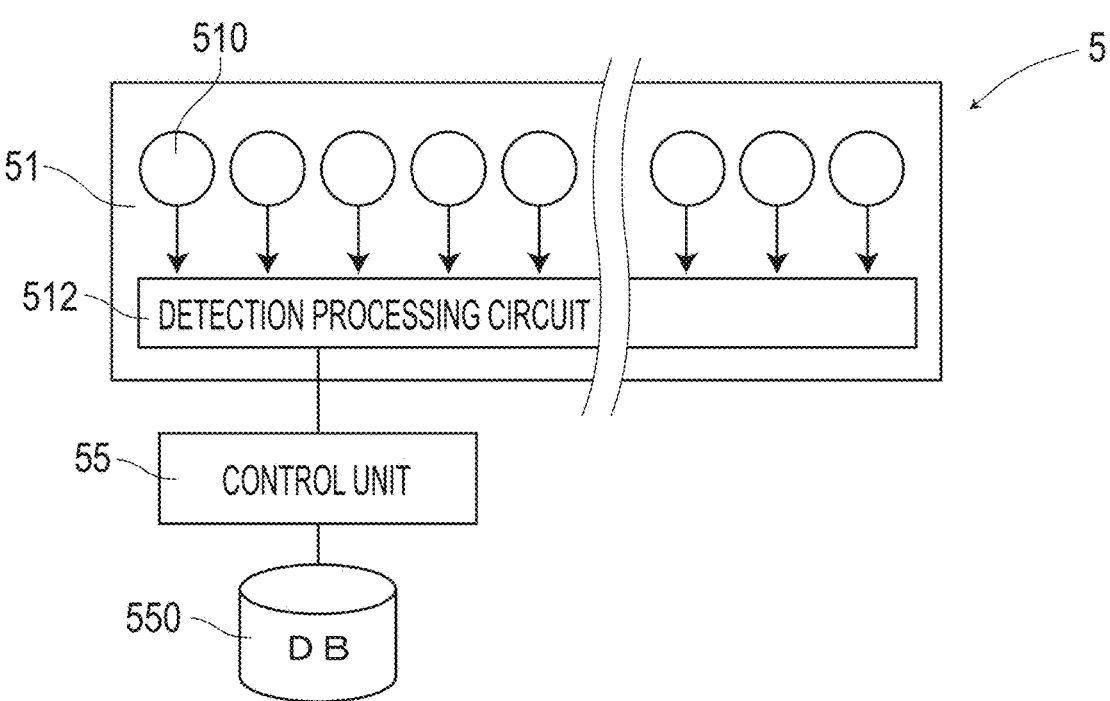
FIG. 4 is a block diagram depicting a system configuration on a vehicle side in the first embodiment.

Here, a system configuration on the vehicle 5 side using vehicle-oriented system 1 is described with reference to FIG. 4. The system on the vehicle 5 side includes sensor array 51 including a plurality of magnetic sensors 510, control unit 55 which controls sensor array 51, database 550 which stores information indicated by each arrangement pattern of magnetic markers 10N, and so forth.

Sensor array 51 is a stick-shaped unit including the plurality of magnetic sensors 510 and detection processing circuit 512 which processes a magnetic measurement value of each magnetic sensor 510. In sensor array 51 forming a stick shape, for example, fifteen magnetic sensors 510 are arrayed on a straight line as being distanced with a predetermined space. Sensor array 51 is attached to vehicle 5 with its longitudinal direction being along a vehicle-width direction.

Magnetic measurement values from respective magnetic sensors 510 of sensor array 51 at the same time point form a one-dimensional magnetic distribution along the vehicle-width direction. Sensor array 51 outputs this one-dimensional magnetic distribution with a frequency of 3 kHz. Also, when the measurement value configuring the one-dimensional magnetic distribution exceeds a predetermined threshold, sensor array 51 outputs a detection signal indicating that magnetic marker 10 has been detected.

Magnetic sensor 510 is, for example, a highly-sensitive MI (Magneto Impedance) sensor. The MI sensor has a linear amorphous wire as a magneto-sensitive body, and can measure the orientation and magnitude of magnetism acting along this amorphous wire. In the present embodiment, each magnetic sensor 510 is assembled to sensor array 51 and sensor array 51 is attached to vehicle 5 so as to be able to measure the magnitude and so forth of magnetism acting along a vertical direction. The above-described one-dimensional magnetic distribution outputted from sensor array 51 is a distribution along the vehicle-width direction of magnetic measurement values along the vertical direction.

Database 550 (FIG. 4) is achieved by using a storage area of a storage device such as a hard disk drive or solid-state drive. In database 550, information corresponding to each arrangement pattern of N-pole magnetic markers 10N is stored. By referring to database 550 by using the arrangement pattern of N-pole magnetic markers 10N, its corresponding information can be identified.

Control unit 55 (FIG. 4) is a unit which controls sensor array 51 and reads the information indicated by information providing area 11 from database 550. Control unit 55 obtains a one-dimensional magnetic distribution periodically outputted from sensor array 51 and sequentially stores it in a storage area not depicted. Control unit 55 stores a one-dimensional magnetic distribution over a previous predetermined time. When storing a new one-dimensional magnetic distribution, control unit 55 erases the oldest one-dimensional magnetic distribution at the time of storing. By stacking one-dimensional magnetic distributions along the forwarding direction of vehicle 5, control unit 55 forms a two-dimensional magnetic distribution by taking the length of sensor array 51 as a width and a distance traveled by vehicle 5 for the previous predetermined time as a vertical dimension.

In the present embodiment, as the above-described predetermined time for storing a one-dimensional magnetic distribution, a time required for vehicle 5 to travel a predetermined distance is set. Therefore, as the speed of vehicle 5 is faster, the above-described predetermined time is shorter time, and as the speed is slower, the above-descried predetermined time is longer time. With this, the vertical dimension of the above-described two-dimensional magnetic distribution formed by control unit 55 can become constant irrespective of the speed of vehicle 5. In the present embodiment, the vertical dimension of the two-dimensional magnetic distribution is set so as to be able to cover information providing area 11 having a size of 1 m×1 m.

Control unit 55 performs process on the above-described two-dimensional magnetic distribution to identify the arrangement of magnetic markers 10 in information providing area 11. Control unit 55 identifies each of the arrangement of N-pole magnetic markers 10N and the arrangement of S-pole magnetic markers 10S. According to three S-pole magnetic markers 10S as signs 100, the position and orientation of information providing area 11 can be identified. Furthermore, according to the arrangement pattern of N-pole magnetic markers 10N, information indicated by information providing area 11 can be identified.

Figure 5:
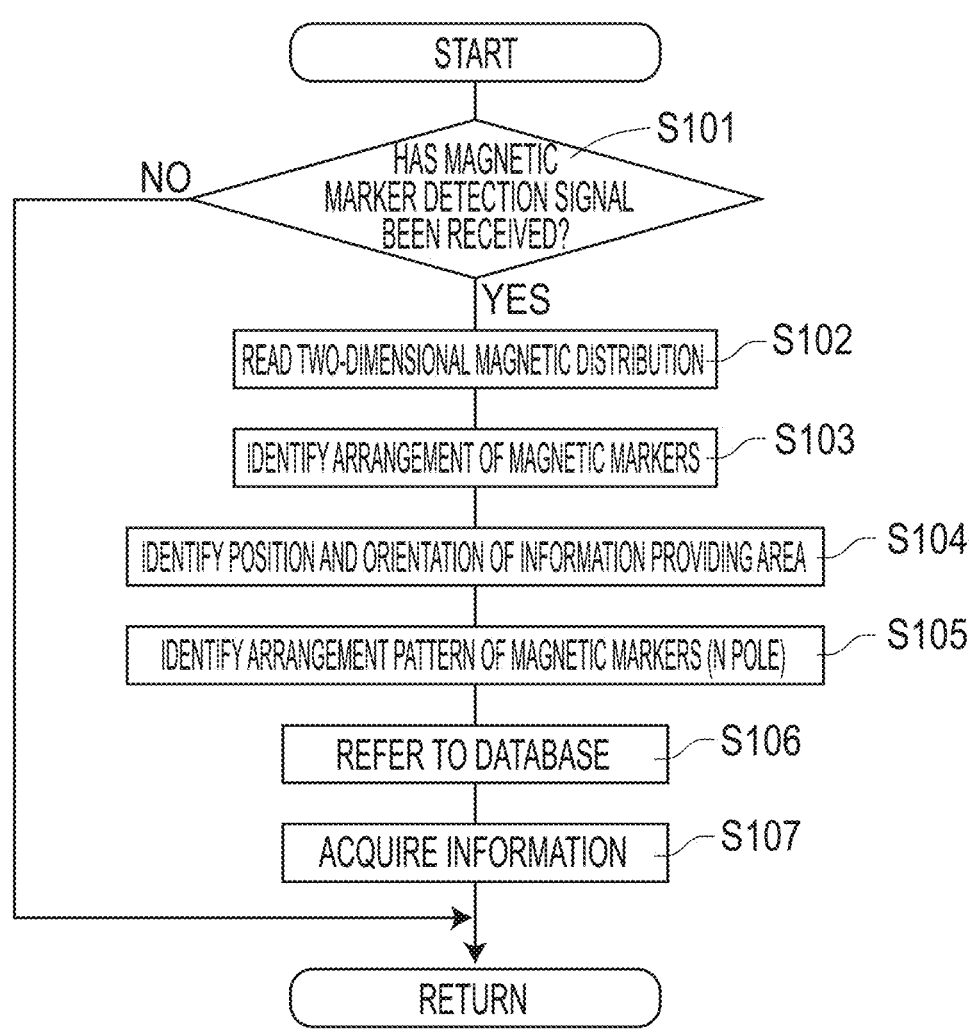
FIG. 5 is a flow diagram depicting the procedure of information reading process in the first embodiment.
Figure 6:
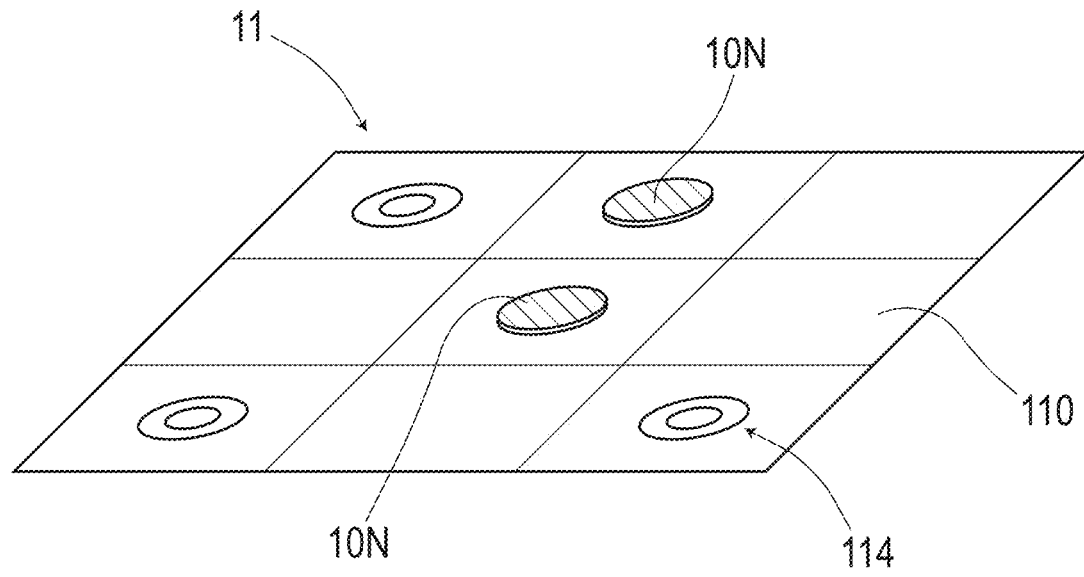
FIG. 6 is a descriptive diagram of another information providing area in the first embodiment.
Figure 7:
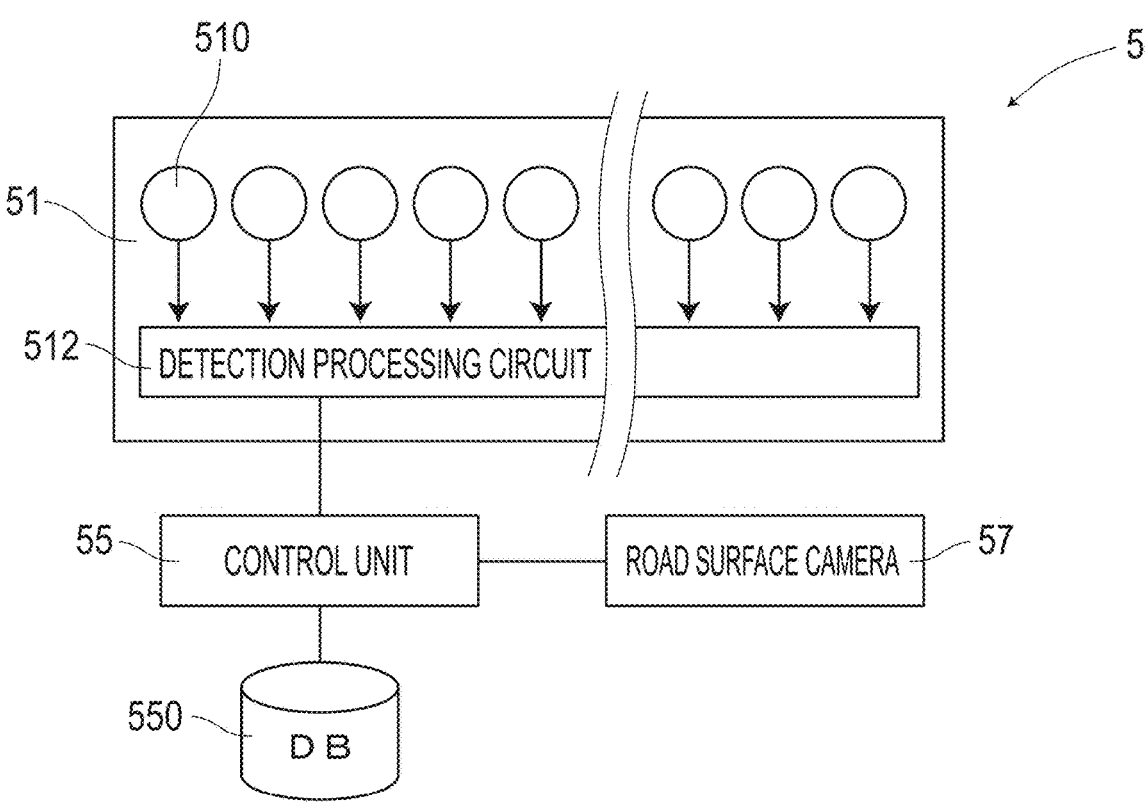
FIG. 7 is a block diagram depicting another system configuration on the vehicle side in the first embodiment.

Here, process to be performed by control unit 55 is described with reference to a flow diagram of FIG. 5. When receiving a signal indicating detection of magnetic marker 10 from sensor array 51 (S101: YES), control unit 55 reads a two-dimensional magnetic distribution based on the above-described one-dimensional magnetic distribution acquired by sensor array 51 from the storage area (omitted in the drawings) (S102). Then, control unit 55 performs process on the two-dimensional magnetic distribution, detects S-pole and N-ole magnetic markers 10, and identifies their arrangement (S103).

Next, based on the arrangement of S-pole magnetic markers 10S, control unit 55 identifies the position and orientation of information providing area 11 (S104). Control unit 55 identifies center section 110 among nine sections 110 of information providing area 11, that is, the center position of information providing area 11, as the position of information providing area 11. Specifically, control unit 55 identifies two sides of information providing area 11 by S-pole magnetic markers 10S positioned at corner portions at three locations, thereby identifying the center position of information providing area 11. Furthermore, control unit 55 identifies the position and orientation of information providing area 11 by the arrangement of S-pole magnetic markers 10S positioned at corner portions at three locations.

Control unit 55 identifies the arrangement pattern of N-pole magnetic markers 10N in information providing area 11 the position and orientation of which have been identified (S105). Then, by using the arrangement pattern of N-pole magnetic markers 10N, control unit 55 refers to database 550 (S106), and identifies information corresponding to the arrangement pattern of N-pole magnetic markers 10N

(S107). By the procedure as described above, control unit 55 reads information from information providing area 11.

In vehicle-oriented system 1, S-pole magnetic markers 10S arranged at the corner portions at three locations of information providing area 11 in a square shape configure signs 100 for identifying the position and orientation of information providing area 11. In vehicle-oriented system 1, by using these signs 100, the position and orientation of information providing area 11 can be identified, and thereby the arrangement pattern of N-pole magnetic markers 10N can be uniquely identified. If the arrangement pattern of N-pole magnetic markers 10N can be uniquely identified, each vehicle 5 arriving at information providing area 11 can read information with high reliability, irrespective of the direction of entering information providing area 11.

Note that in the present embodiment, the configuration is described that database 550 for storing information indicated by information providing area 11 is provided to each vehicle 5. In place of this configuration, a database may be provided to a server device with which vehicle 5 can communicate. In this case, by rewriting information in the database, information to be provided to the vehicle side can be changed anytime.

In place of the present embodiment, the configuration may be such that different information can be read on the vehicle 5 side in accordance with the direction of entering information providing area 11. In the configuration of the present embodiment, the position and orientation of information providing area 11 can be identified on the vehicle 5 side. Thus, information to be provided can be changed in accordance with the direction in which vehicle 5 passes over information providing area 11. For example, in application to a route in which the forwarding direction is defined as one direction, information to be provided is preferably changed in accordance with the forwarding direction of vehicle 5. For example, while information such as the speed limit is provided to a vehicle normally traveling a route, it is possible to provide information indicating wrong-way to a vehicle traveling the wrong way.

Note that in the present embodiment, as a plane where vehicle 5 travels, a paved surface forming a container yard at a harbor, a ramp area at an airport, or the like is exemplarily described. Vehicle-oriented system 1 may be applied to a road where general vehicles travel.

Also in the present embodiment, as one example of sign 100, signs by S-pole magnetic markers 10S at the corner portions at three locations are exemplarily described. In place of S-pole magnetic markers 10S, double circles 114 as exemplarily depicted in FIG. 6 may be provided by printing or the like. For example, by adopting a system on the vehicle 5 side of FIG. 7 including road surface camera 57 which takes an image of the paved surface, information can be read from information providing area 11 of FIG. 6. According to the system of FIG. 7, magnetic markers 10N can be detected by sensor array 51, and double circles 114 can be detected by road surface camera 57. Control unit 55 identifies the position and orientation of information providing area 11 by the arrangement of double circle 114, and can read information based on the arrangement pattern of magnetic markers 10N. When this configuration is adopted, N-pole magnetic markers 10N may be arranged so that double circles 114 forming signs 100 overlap. When signs 100 are arranged in this manner, all nine sections 110 configuring information providing area 11 can be used to indicate information. Furthermore, in this case, S-pole magnetic markers 10S can be used to indicate information. According to a combination of N-pole magnetic markers 10N and S-pole magnetic markers 10S, the amount of information that can be provided to the vehicle side can be increased.

Note that image-like (externally-viewable) signs 100 are only required to be externally identifiable and may be in a variety of forms such as quadrangles or triangles, in place of double circles. Furthermore, a sign may be made of a combination of forms of a plurality of types such as a double circle and a quadrangle. An example of the externally identifiable form may be an external form which becomes visible when light is applied, for example, a reflective member or coating with reflective paint. As a position of the external form, it may be provided inside information providing area 11 or outside information providing area 11. For example, the external form may be provided outside information providing area 11 so as to be adjacent to three corner portions (vertexes) of information providing area.

Figure 8:
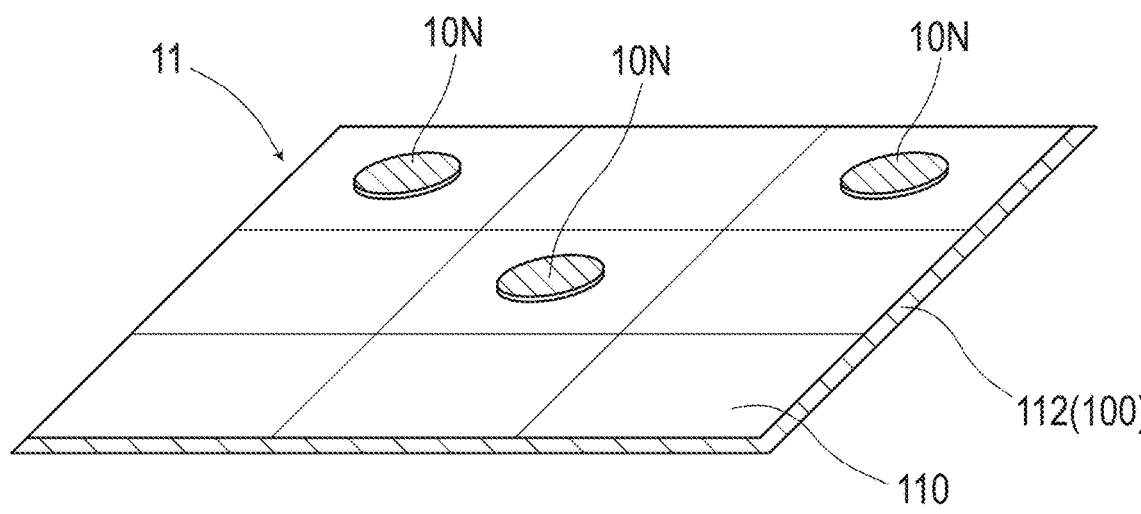
FIG. 8 is a descriptive diagram depicting still another information providing area in the first embodiment.
Figure 9:
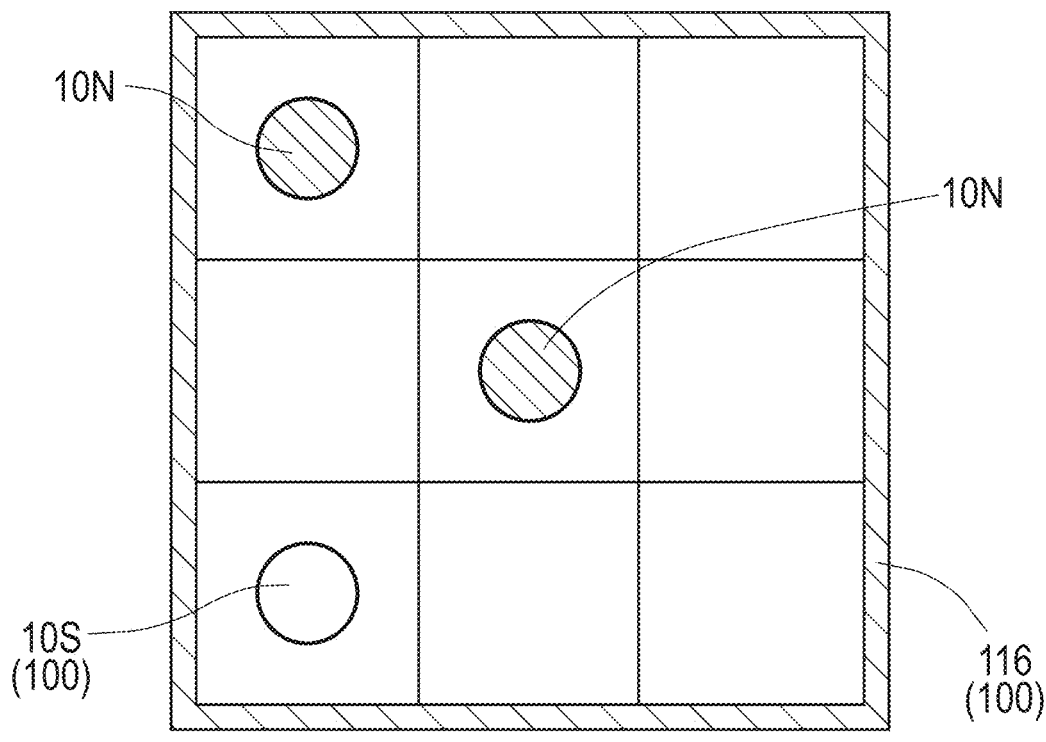
FIG. 9 is a descriptive diagram depicting yet another information providing area in the first embodiment.
Figure 10:
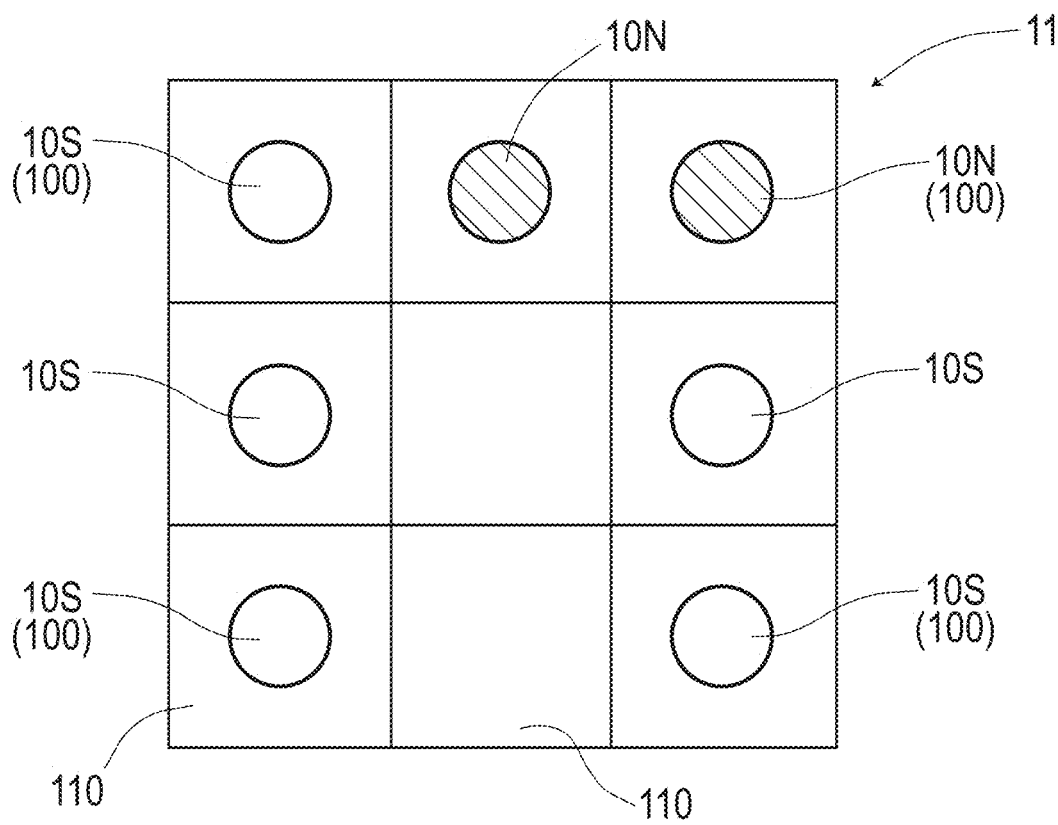
FIG. 10 is a descriptive diagram depicting further information providing area in the first embodiment.

As in FIG. 8, L-shaped paint 112 along two sides of information providing area 11 may be provided as sign 100. In this manner, sign 100 may be arranged on an outer circumferential side of information providing area 11. Also as in FIG. 9, sign 100 may be a combination of print of frame 116 surrounding information providing area 11 (one example of an external sign detectable in a taken image of information providing area 11) and S-pole magnetic marker 10S at a corner portion at one location (one example of a magnetically-detectable magnetic sign). That is, sign 100 may be one identifiable by a combination of a magnetic method and an image-like method. Note that S-pole magnetic marker 10S in the drawing may be replaced by print of double circles.

Note that in the present embodiment, circular magnetic markers 10 are arranged in nine sections 110 of information providing area 11. The shape of each magnetic marker can be changed as appropriate. Furthermore, magnetic markers each having the same size as that of each section 110 may be adopted.

The size and the shape of information providing area 11 and the number of sections 110 are not limited to those in the configuration of the present embodiment. These can be changed as appropriate.

The information providing area may be formed of a rubber sheet (one example of a sheet body) made of a material with magnetic powder mixed into a rubber material. In this case, each position of the rubber sheet is preferably magnetized to form a predetermined magnetic distribution. As the magnetic distribution, for example, a distribution which simulates the arrangement of magnetic markers 10 (refer to FIG. 2) may be adopted. Alternatively, without dividing information providing area into sections (reference sign 110 in FIG. 2), a magnetic distribution in which magnetic intensity continuously changes so as to exhibit predetermined undulations may be adopted. The continuously changing magnetic distribution can be a sign for identifying the position and orientation of information providing area 11. Furthermore, a magnetic singular point may be provided by a magnetic marker in the continuously changing magnetic distribution. The magnetic singular point by the magnetic marker helps improve accuracy when the position and orientation of information providing area 11 are identified.

Note that while a sheet-like magnetic marker is exemplarily described in the present embodiment, for example, a columnar piece-like magnetic marker made of a plastic magnet may be adopted. In the case of the columnar magnetic marker, it is preferably accommodated in a hole made in the road surface or the like and thereby buried in the road surface.

Figure 2:
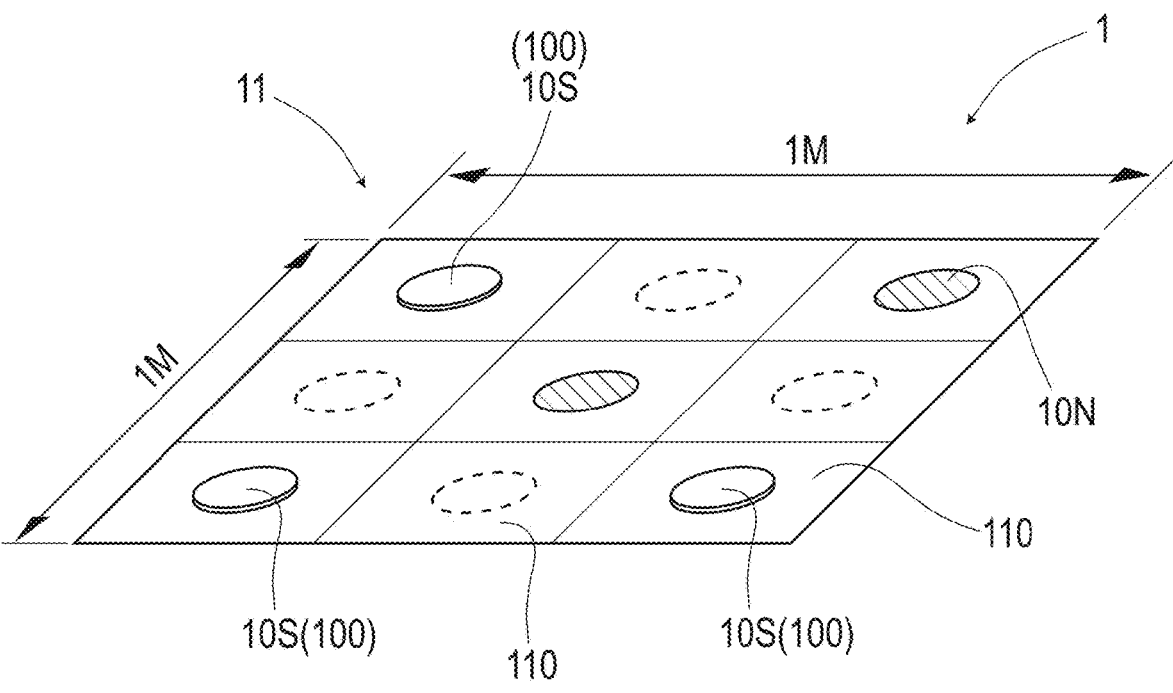
FIG. 2 is a descriptive diagram of an information providing area in the first embodiment.
Figure 3:
FIG. 3 is a diagram depicting a magnetic marker in the first embodiment.

In the present embodiment, for example, as in FIG. 1 and FIG. 2, boundaries between sections 110 forming information providing area 11 are clearly indicated by lines. The boundaries of sections 110 are only required to be virtual boundaries, and indicating lines on boundaries is not an imperative configuration.

In the present embodiment, as signs 100 which can identify the position and orientation of information providing area 11, S-pole magnetic markers 10S arranged at corner portions at three locations of information providing area 11 in a square shape are exemplarily described. For example, S-pole magnetic markers 10S arranged at three locations on diagonal lines of information providing area 11 in a square shape may be taken as signs 100. S-pole magnetic markers 10S for signs 100 may be arranged in any manner as long as the mode can identify the position and orientation of information providing area 11.

In the present embodiment, S-pole magnetic markers 10S are exemplarily described as magnetic markers 10 for signs 100, and N-pole magnetic markers 10N are exemplarily described as magnetic markers 10 for providing information. S-pole magnetic markers 10S and N-pole magnetic markers 10N may be reversed. Alternatively, signs 100 may be a combination of S-pole magnetic marker 10S and N-pole magnetic marker 10N, or information may be indicated by a similar combination. For example, as in FIG. 10, magnetic markers for signs 100 may be arranged in sections 110 at corner portions at four locations of information providing area 11 in a square shape, and magnetic markers 10 for information provision may be arranged in the remaining sections. As magnetic marker 10 for sign 100, for example, a combination of N-pole magnetic marker 10N at one location and S-pole magnetic markers 10S at the other three locations can be adopted. As magnetic marker 10 for information provision, as in the drawing, a combination of N-pole magnetic marker 10N and S-pole magnetic marker 10S may be adopted. Alternatively, information may be provided by an arrangement of magnetic markers 10 having magnetic polarity of any one type.

In the present embodiment, a square-shaped area is exemplarily described as information providing area 11. However, the shape of information providing area 11 is not limited to a square. Any of various shapes can be adopted, such as a triangular shape, a pentagonal shape, a hexagonal shape, a circular shape, an oval shape, and a diamond shape.

Second Embodiment

Figure 11:
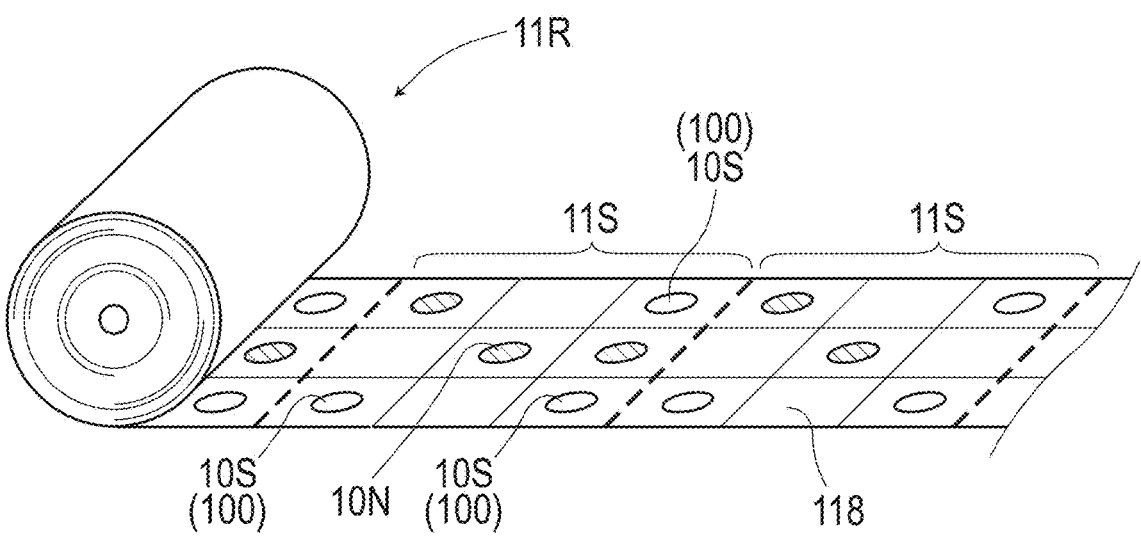
FIG. 11 is a perspective view depicting a roll body with a stick-on sheet forming an information providing area wound therearound in a second embodiment.
Figure 12:
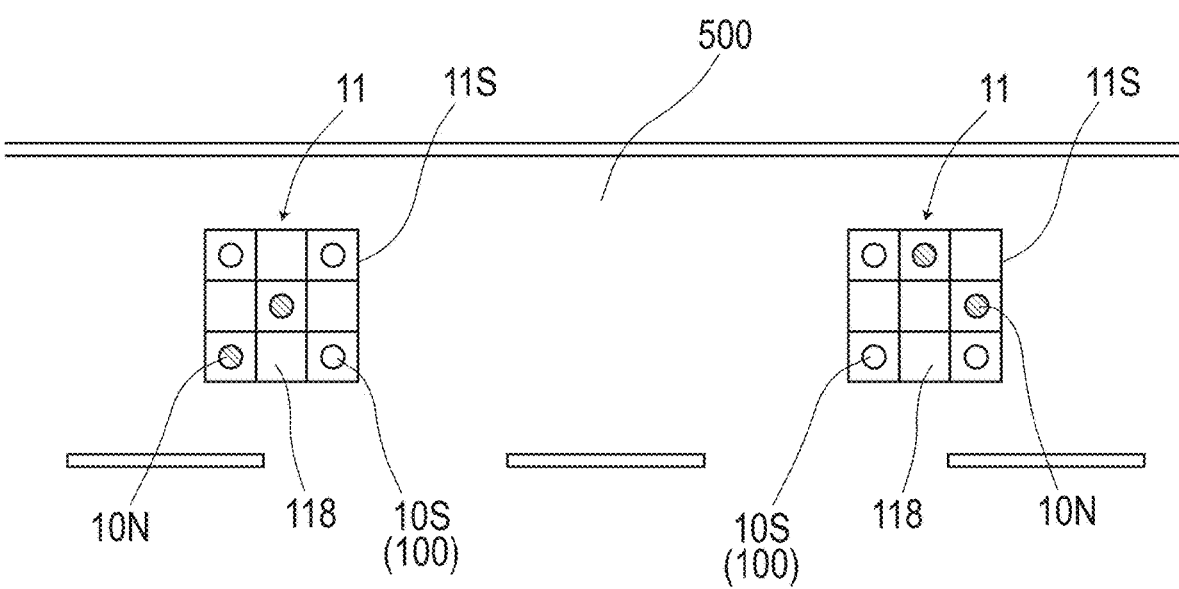
FIG. 12 is a diagram exemplarily depicting a lane where the stick-on sheet forming an information providing area is laid in the second embodiment.

The present embodiment is an example in which, based on vehicle-oriented system 1 of the first embodiment, the method of forming information providing area 11 is changed. The details of this are described with reference to FIG. 11 to FIG. 13.

In the first embodiment, information providing area (sign 11 in FIG. 2) is provided on the paved surface, and magnetic marker 10 is arranged on each section (sign 110 in the drawing) of information providing area 11. In place of this, in the present embodiment, stick-on sheet 11S (one example of a sheet body) in a square shape forming information providing area 11 is prepared, and that sheet 11S is sticked onto the paved surface. The stick-on sheet 11S is a sheet where magnetic markers 10 are bonded onto the surface of base sheet 118. Base sheet 118 is, for example, a sheet with a glass fiber cloth containing asphalt in a molten state (one example of a paving material of the paved surface) by impregnation or the like.

On stick-on sheet 11S, S-pole magnetic markers 10S forming signs 100 are arranged at corners at three locations, and N-pole magnetic markers 10N are arranged so as to form a predetermined arrangement pattern. Roll body 11R with a continuous sheet where a plurality of stick-on sheets 11S continues wounded therearound may be adopted. The form of roll body 11R makes it easy to store, carry, and so forth the plurality of stick-on sheets 11S. By rolling out the tip of the continuous sheet from this roll body 11R and cutting it at a predetermined position, stick-on sheet 11S can be obtained. Note that a work of individually cutting out stick-on sheets 11S may be performed at the time of laying stick-on sheets 11S or may be performed in advance in a factory or the like.

At the time of laying sheets 11S, asphalt with which base sheet 118 is impregnated may be heated so as to be molten or softened and asphalt may be caused to function as a bonding material. Alternatively, asphalt, which is a paving material for the paved surface, may be heated in advance and stick-on sheets 11S may be arranged thereon. In this case, asphalt of stick-on sheet 11S can be heated by heat of the paved surface to be molten or softened, allowing sheets 11S to be bonded.

In information providing area 11 formed by sticking stick-on sheets 11S thereon, S-pole magnetic markers 10S arranged at corner portions at three locations serve as signs 100 for identifying the position and orientation of information providing area 11. Therefore, when stick-on sheet 11S is sticked, it is not required to align the orientation of sheet 11S with a predetermined direction. Also, since the position of information providing area 11 can be identified by signs 100, there is less necessity of positional alignment when sheet 11S is sticked to. If there is less necessity of positional alignment of sheet 11S and no necessity of alignment of the orientation of sheet 11S, stick-on sheet 11S can be laid with high workability, and information providing area 11 can be efficiently formed. For example, as in FIG. 12, when information providing area 11 is provided on lane 500 where general vehicles travel, the orientation of each stick-on sheet 11S may be varied. Also, the position where sheet 11S is sticked to is only required to be roughly at a supposed position.

Figure 13:
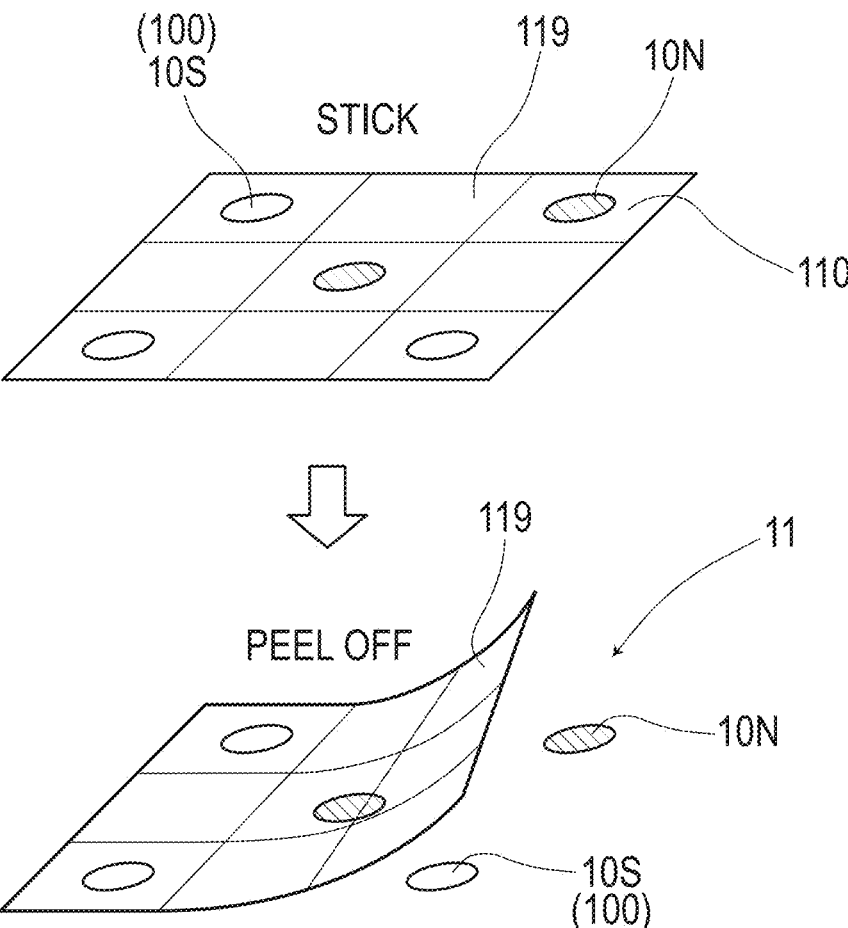
FIG. 13 is a descriptive diagram of another method of laying the information providing area in the second embodiment.

Note that as in FIG. 13, in place of base sheet 118, for example, retaining sheet 119 such as a silicon sheet or polyethylene film may be adopted. Retaining sheet 119 such as a silicon sheet or polyethylene film is resistant to adhesive force by a bonding material or the like, and is relatively easily peeled off.

It is preferable that retaining sheet 119 with magnetic markers 10 sticked thereon is prepared, and retaining sheet 119 is pushed, with magnetic markers 10 oriented inside, onto the paved surface coated with a bonding material. Thereafter, retaining sheet 119 is peeled off. Thus, retaining sheet can be removed in a state in which magnetic markers 10 are transferred and bonded to the paved surface. By peeling off retaining sheet 119, information providing area 11 similar to that in the first embodiment can be formed.

Note that the other configurations and the operation and effects are similar to those in the first embodiment.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 vehicle-oriented system
10 magnetic marker
10N N-pole magnetic marker
10S S-pole magnetic marker
101 magnet sheet
100 sign
11 information providing area
110 section
5 vehicle
500 lane
51 sensor array
510 magnetic sensor
512 detection processing circuit
55 control unit
550 database
57 road surface camera

The invention claimed is:

1. A vehicle-oriented system comprising:
a plurality of information providing areas provided on a plane where a vehicle moves, for providing information to the vehicle,
wherein the plurality of information providing areas are two-dimensionally arranged to form grid points on the plane,
wherein each of the plurality of information providing areas is a two-dimensional area forming a rectangular shape where a plurality of piece-like magnetic markers are two-dimensionally arrayed,
wherein in each of the plurality of information providing areas, a magnetic distribution indicating the information is formed by a distribution pattern of the plurality of piece-like magnetic markers, and a sign to identify a position and orientation of corresponding information providing area is provided, individually from the plurality of piece-like magnetic markers.

2. The vehicle-oriented system in claim 1, wherein the sign is a magnetically-detectable magnetic sign.

3. The vehicle-oriented system in claim 1, wherein the magnetic distribution is formed by at least one of the plurality of piece-like magnetic markers arranged in each of the plurality of information providing areas, and
the sign is a magnetic sign based on magnetic polarity of the at least one of the plurality of piece-like magnetic markers to be detected by the vehicle.

4. A vehicle-oriented system comprising:
an information providing area provided on a plane where a vehicle moves, for providing information to the vehicle,
wherein in the information providing area, a magnetic distribution indicating the information is formed, and a sign to identify a position and orientation of the information providing area is provided,
wherein the magnetic distribution is formed by at least one piece-like magnetic marker arranged in the information providing area,
wherein the sign is a magnetic sign based on magnetic polarity of the at least one piece-like magnetic marker to be detected by the vehicle, wherein the information providing area is a two-dimensional area forming a rectangular shape where the at least one piece-like magnetic marker is two-dimensionally arrayed, and wherein the sign is formed of three magnetic markers arranged at three locations of four locations forming corner portions of the two-dimensional area in the rectangular shape.

5. The vehicle-oriented system in claim 1, wherein the plurality of information providing areas are formed by arranging, on the plane, a sheet body made of a material with magnetic powder mixed therein, and the magnetic distribution is a magnetic distribution obtained by magnetizing the sheet body.

6. The vehicle-oriented system in claim 1, wherein the plurality of information providing areas are formed by arranging, on the plane, a sheet body where at least one of the plurality of piece-like magnetic markers is arranged on a surface of a base sheet.

7. The vehicle-oriented system in claim 5, wherein the sheet body is cut out from a continuous sheet from which a plurality of separatable sheet bodies.

8. The vehicle-oriented system in claim 5, wherein the sheet body contains a paving material of a paved surface.

9. The vehicle-oriented system in claim 1, wherein at least one of the plurality of information providing areas is formed by transferring, from a retaining sheet where at least one of the plurality of piece-like magnetic markers is arranged on a surface, to at least one piece-like magnetic marker to the plane.

10. The vehicle-oriented system in claim 1, wherein the magnetic distribution is a distribution where magnetic intensity continuously changes and, in each of the plurality of information providing areas, at least one of the plurality of piece-like magnetic markers is arranged in the magnetic distribution as a magnetic singular point.

11. The vehicle-oriented system in claim 1, wherein the sign is an external sign to be detected in a taken image of at least one of the plurality of information providing areas.

12. The vehicle-oriented system in claim 11, wherein the sign is provided to be at least partially overlapped with the magnetic distribution.

13. The vehicle-oriented system in claim 11, wherein the sign is arranged on an outer circumferential side of at least one of the plurality of information providing areas.

14. The vehicle-oriented system in claim 1, wherein the information varied in accordance with a direction of the vehicle entering at least one of the plurality of information providing areas is provided to the vehicle.

15. The vehicle-oriented system in claim 1, wherein the sign is formed of a combination of a magnetically-detectable magnetic sign and an external sign to be detected in a taken image of at least one of the plurality of information providing areas.

16. An information reading method comprising:

obtaining a magnetic distribution in at least one of a plurality of information providing areas when a vehicle passes over the at least one of a plurality of information providing areas, the plurality of information providing areas being provided on a plane where the vehicle moves, for providing information to the vehicle, and in each of the plurality of information providing areas, the magnetic distribution indicating the information being formed by a distribution pattern of a plurality of piece-like magnetic markers;

identifying orientation of the at least one of the plurality of information providing areas by detecting a sign, the sign being provided to identify a position and orientation of corresponding information providing area, individually from the plurality of piece-like magnetic markers; and identifying and reading the information indicated by the obtained magnetic distribution in accordance with the identified orientation of the corresponding information providing area, wherein the plurality of information providing areas are two-dimensionally arranged to form grid points on the plane, and wherein each of the plurality of information providing areas is a two-dimensional area forming a rectangular shape where the plurality of piece-like magnetic markers are two-dimensionally arrayed.

17. The information reading method in claim 16, wherein the sign is a magnetically-detectable magnetic sign, and by magnetically detecting the sign, the orientation of the corresponding information providing area is identified.

18. The information reading method in claim 16, wherein the magnetic distribution is formed by at least one of the plurality of piece-like magnetic markers arranged in each of the plurality of information providing areas, the sign is a magnetic sign based on magnetic polarity of the at least one of the plurality of piece-like magnetic markers to be detected by the vehicle, and by magnetically detecting the sign, the orientation of the corresponding information providing area is identified.

19. The information reading method in claim 16, wherein the sign is an external sign to be detected in a taken image of at least one of the plurality of information providing areas, and by performing image processing on the taken image of the at least one of the plurality of information providing areas and detecting the sign, the orientation of the corresponding information providing area is identified.

* * * * *